ABSTRACT OF THE DISCLOSURE

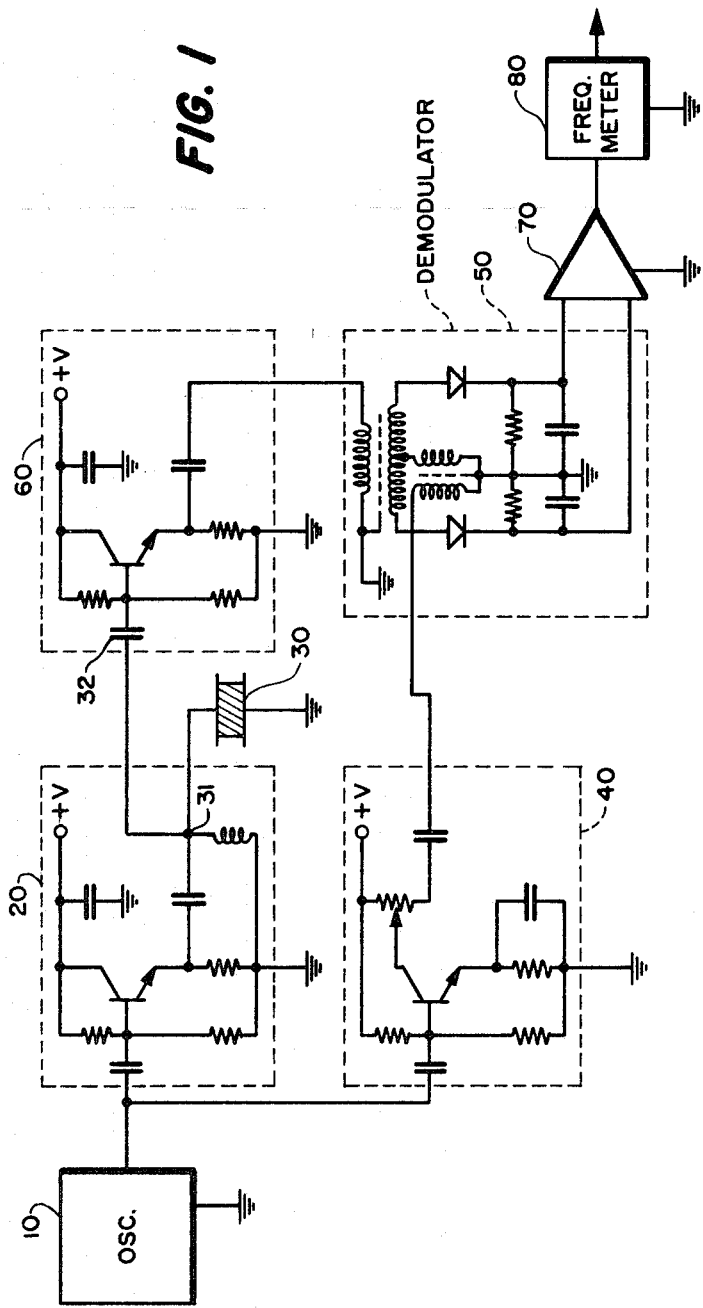
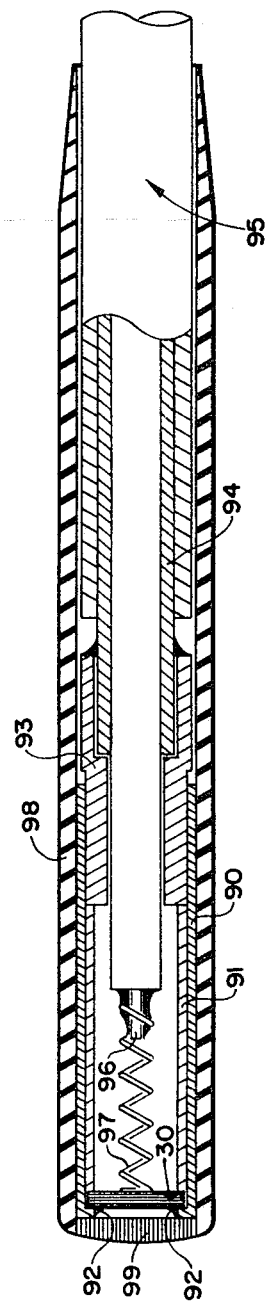
INVENTOR.
CEDRIC H. BEEBE — MAX D. LISTON
BY JOHN T. WOOLHOUSE 've# 3,443,433
FLOWMETER Max D. Liston, La Habra, Cedric H. Beebe, Fullerton, and John T. Woolhouse, Covina, Calif., assignors to Beckman Instruments, Inc., a corporation of California
Filed June 28, 1965, Ser. No. 467,555
Int. Cl. G01f 1/00
U.S. Cl. 73—194                                            10 Claims

An ultrasonic flowmeter using a single crystal transducer which receives driving signals from an oscillator simultaneously with reflected signals from particles in the flow stream thereby providing a carrier signal modulated by a Doppler shifted frequency signal indicative of the velocity of fluid flow. The transducer comprises a piezoelectric crystal from which piezoelectric signals indicative of fluid pressure are derived. In one embodiment, a synchronous demodulator is employed to detect the Doppler shift of the reflected signal. In another embodiment, the demodulator is of the ratio detector type. In both embodiments, the need for switching the transducer from the oscillator to a receiving amplifier is obviated. This arrangement is ideal for blood flowmeters as only one transducer is required in the vascular catheter.

---

This invention relates to ultrasonic flowmeters and more particularly to a single transducer ultrasonic flowmeter for measuring fluid flow, such as blood flow in animals.

Numerous approaches have been devised for measuring fluid flow. One example of an electro-acoustic flowmeter may be found in U.S. Patent No. 2,912,856 which utilizes a pair of piezoelectric transducers mounted on opposite sides of a pipe through which fluid flows. Each transducer includes, in effect, a transmitting piezoelectric crystal and a receiving piezoelectric crystal. The transmitting crystal of one transducer and the receiving crystal of the other transducer are interconnected by a feedback circuit including an amplifier and a wave packet generator. Each received wave packet is amplified and triggers the generator so as to cause wave packets to the repropagated in a sustained manner. The acoustic waves are thus propagated through the fluid in opposite directions along substantially the same path. Any change in the flow velocity of the fluid will be accompanied by a corresponding change in the repetition frequency of the wave packets and the magnitudes of the respective changes will be in constant direct ratio to the flow velocity being measured.

Various problems are encountered in measuring the flow of biological fluids, such as blood, in animals. Probably the most successful techniques have been the use of acoustical, ultrasonic and electromagnetic flowmeters. Other techniques including the use of rotameters, bubble flowmeters and Pitot tubes also have been tried. Because these latter devices come in contact with the fluid, their calibration is easily affected by clotting when used as blood flowmeters. The electromagnetic or ultrasonic flowmeter has been considered as a more suitable device for blood flow since it is used external to the vessel. Many of the flows which are of importance in physiological investigations are in small vessels and in vessels with low flow velocities. Various experiments with ultrasonic flowmeters are described in an article entitled, "Pulsed Ultrasonic Transit Time Flowmeter," by D. L. Franklin et al. which appeared in I. R. E. Transactions on Bio-Medical Electronics, vol. 9, No. 1, January 1962, and an article entitled, "A Phase-Shift Ultrasonic Flowmeter," by W. C. Zarnstorff et al. which appeared in vol. 9, No. 3, of the same Transactions in July, 1962.

The operation of an ultrasonic flowmeter is based upon the principle that ultrasonic waves traveling in a moving medium travel slightly faster downstream and slower upstream. The difference in effective velocity of the waves or pulses alternately upstream and downstream is a measure of the velocity of the fluid. As noted in the first publication, "Pulsed Ultrasonic Transit Time Flowmeter," cited above, barium titanate crystals are mounted at diagonally opposite positions in a rigid plastic cylinder, and bursts of ultrasound travel from one crystal to the other in either direction in the same time so long as the medium between them is stationary. When the medium is flowing through the cylinder, the transit time of sound between the two crystals is slightly greater upstream than downstream.

There are two principal methods of measuring transit time of the wave in the fluid. First, a short burst or pulse of energy may be sent through the fluid to a receiving point and the transit time determined by measuring the elapsed time between the transmitted pulse and the received pulse. By repeating this alternately upstream and downstream the difference in transit time can be determined. A second approach is to send a continuous sinusoidal wave from the transmitting element to the receiving element and measure the transit time by determining the phase shift between the received signal and the transmitted signal. The phase shift is proportional to the total time delay in the direction of transmission. The difference in transit time can then be obtained by comparing the upstream phase shift to the downstream phase shift. This latter approach is discussed in greater detail in the second article "A Phase Shift Ultrasonic Flowmeter" discussed above.

Although the ultrasonic flowmeter techniques discussed above have proved successful, it is frequently desirable to provide an accurate flowmeter of such size that it may be suitably used in a catheter. Accordingly, it is an object of the present invention to provide an improved ultrasonic flowmeter for biological liquids which is suitable for catheter use.

It is an additional object of the present invention to provide an improved ultrasonic flowmeter for use in biological liquids in which a single transducer is used as a generator and receiver.

It is a further object of the present invention to provide an ultrasonic Doppler flowmeter in which a single transducer may be used both as a transmitter and receiver simultaneously.

It is another object of this invention to provide an improved ultrasonic flowmeter utilizing a single transducer, which is small enough to be inserted into a catheter, and in which the transducer may simultaneously function as a transmitter and receiver.

In accordance with a specific exemplary embodiment of the present invention, an ultrasonic flowmeter for measuring flow in liquids is provided. A single ultrasonic transducer is employed as well as Doppler shift measurement techniques. An oscillator provides signals, typically at frequencies greater than five megacycles, to an ultrasonic crystal transducer. Signals from the oscillator, as well as signals received by the ultrasonic transducer from particles in the flow stream, are applied to a demodulator. The demodulator provides output signals proportional to the difference between the input signals thereto. The difference signals are amplified and applied to a frequency meter which provides a voltage output for metering or recording.

When used for measuring blood flow, the oscillator is typically operated at a frequency around 10 to 15 megacycles. It has been found that Doppler echoes received from blood increase as the excitation frequency of the transducer is increased. At lower frequencies, such as 5 megacycles and below, the Doppler echoes are smaller and may become masked by the vibrations of other tissues that are moving within the body, such as the heart and artery walls, and it is more difficult to obtain reliable blood flow measurements. At the higher frequencies, very reliable signals are received. This is a result of stronger echoes being received from blood particles at the higher frequencies, and because the attenuation of the radiated ultrasound is much faster at the higher frequencies such that the distance from which echoes can be received is more restricted thereby limiting the probability that body tissue outside the vessel will produce interfering signals.

Other objects and features of the present invention will become more readily apparent through a consideration of the following detailed description taken in connection with the appended drawings, in which:

FIG. 1 is a combined block and schematic diagram of a Doppler flowmeter constructed in accordance with the teachings of the present invention;

FIG. 2 illustrates a suitable transducer construction for use with the flowmeter of the present invention.

Figure 3:
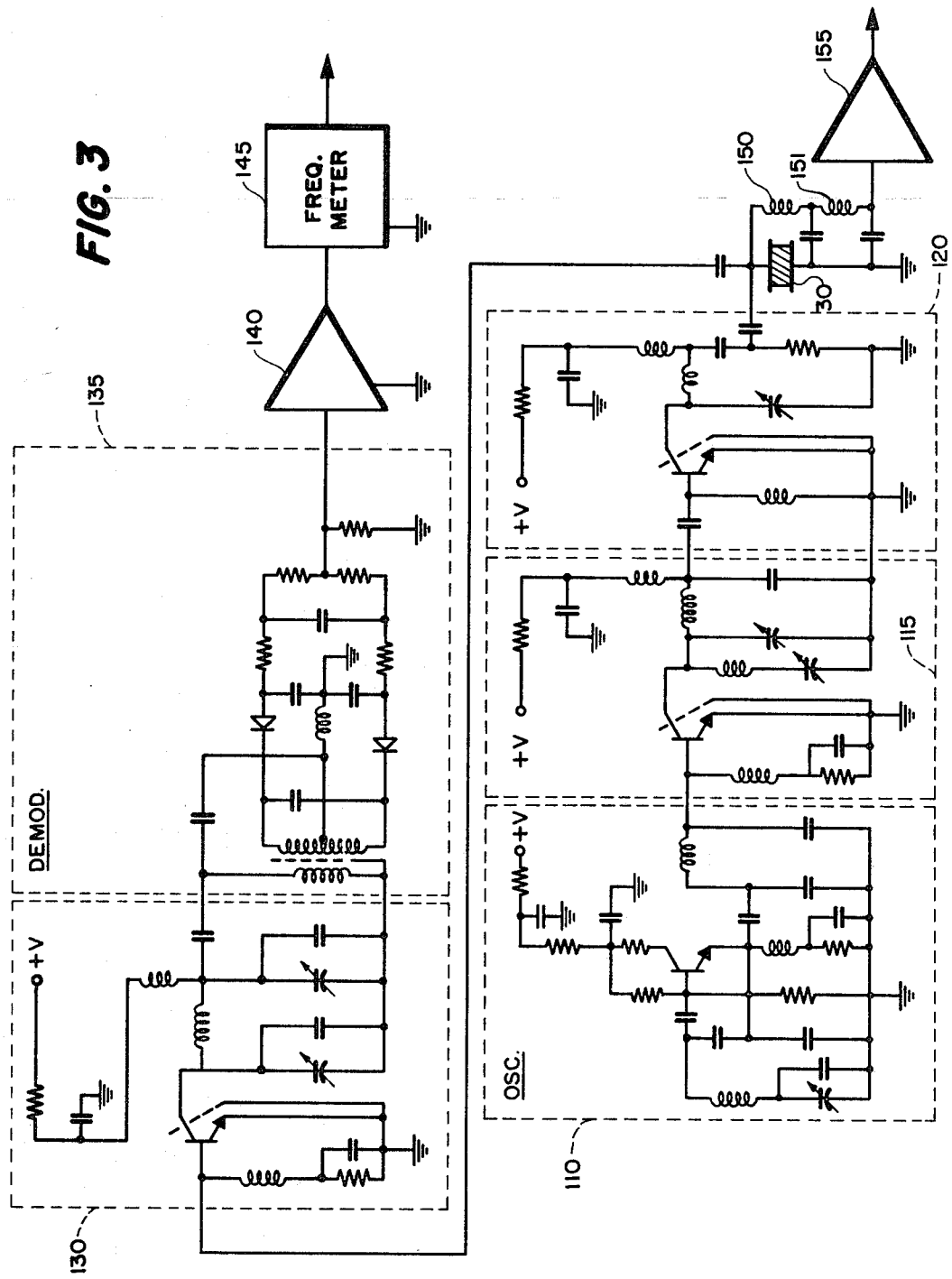
FIG. 3 illustrates another embodiment of a flowmeter.

Turning now to FIG. 1, the output of a suitable oscillator 10, such as a Hewlett-Packard type 606A signal generator, is connected through a buffer amplifier 20 to a crystal transducer 30. The crystal may be fashioned from barium titanate. The buffer amplifier 20 is a conventional transistorized A.C. amplifier, and has a high output impedance for matching the high input impedance of the crystal 30. The crystal 30 may be mounted in a suitable probe as shown in FIG. 2 which will be discussed subsequently. The output of the oscillator 10 also is connected through a buffer amplifier 40 to provide a reference input to a synchronous demodulator 50. Signals received by the crystal 30 from constituents or particles in the flow stream are applied through a buffer amplifier 60 to the demodulator 50. The amplifier 60 is an A.C. transistorized amplifier and has a high input impedance.

The demodulator 50 provides a differential audio output. Doppler frequency signals received by the crystal 30 and applied through the amplifier 60 to the demodulator 50 of a different frequency from the carrier result in an audio output from the demodulator 50. That is, echoes impinging upon the crystal 30 received from moving particles effectively are superimposed on the carrier frequency in the demodulator 50. These echoes, being of a different frequency than the carrier, beat in the synchronous demodulator 50 to form an audio output signal which is equal to the difference between the carrier and the received Doppler frequency. This audio output, or difference frequency, is amplified by a high gain differential amplifier 70, such as a Tektronix type 53/54D preamplifier, and applied to a conventional frequency meter 80, such as Hewlett-Packard type 500B, which converts the input frequency thereto to a voltage output. The output of the frequency meter 80 may be applied to a recorder or similar device for providing a record of the velocity of flow. The signal may be filtered before application to the recorder in order to remove any undesired frequency signals.

The difference frequency from the output of the demodulator 50, which is representative of flow, can be interpreted directly in terms of the velocity of the flow by the following equation:

$$V = \frac{\Delta F}{2F} \times S$$

where,
V = the velocity of flow in a medium;
ΔF = the difference between the oscillator frequency and the Doppler frequency;
F = the oscilaltor frequency; and
S = the speed of sound in the medium where the measurement is being taken.

One of the primary uses of the flowmeter of this invention is for the measurement of blood flow in an artery. The most convenient method of introducing the crystal into an artery is by mounting the crystal in a probe and placing the probe in the end of a small catheter which can then be inserted into an artery or vein. Crystals having a diameter as small as .033 inch and a thickness of approximately .006 inch have been used successfully with the flowmeter of the present invention. The entire probe assembly may be mounted within a number 15 needle or French size 6 catheter.

It has been discovered that the Doppler echoes received from blood increase as the frequency is increased. At frequencies of 5 megacycles or below the echoes are small and may be masked by the vibrations of the other tissues that are moving, such as the heart and the artery walls, and it is difficult to get reliable blood flow measurements at these frequencies without providing a high drive level for the crystal. At 10 megacycles and above, very reliable frequencies are received. At the higher frequencies stronger echoes are received from the blood particles, and the attenuation of the radiated ultrasound is much faster at the higher frequencies so that the distance from which echoes can be received is more restricted, thereby limiting the probability that the tissue outside the vessel can produce interfering signals. Additionally, it has been found that larger audio signal voltages are generated when the crystal drive signal is rich in harmonics.

FIG. 2 illustrates a suitable construction for a flowmeter probe. The transducer crystal 30 is supported by a transducer sleeve 90, and a back-up sleeve 91. The sleeve 90 is made of metal and provides an electrical connection with the front face of the crystal 30 in any suitable manner, such as through the use of a conductive epoxy resin 92. The back-up sleeve 91 is constructed of an insulating material, such as Teflon fluorocarbon resin manufactured by E. I. du Pont Company. The sleeve 90 is electrically connected through a shield sleeve 93 to the shield or braid conductor 94 of a suitable coaxial cable 95. Typically, the sleeve 93 is soldered to the shield conductor 94. An inner conductor 96 of the cable 95 is electrically connected to the rear face of the transducer crystal 30 by means of a contact spring 97. The contact spring 97 may be connected to the conductor 96 by means of solder or conductive epoxy. The entire assembly is covered with an insulating cap 98 made of a suitable plastic. If the transducer is employed in a probe, the probe itself may be used as an outer support sleeve and may be electrically connected to the sleeve 90. The end of the probe is sealed with a suitable epoxy resin 99. Typically, a probe as shown in FIG. 2 may have a diameter of 0.055 inch and a length of 0.4 inch.

The concepts of the present invention also may be utilized for making pressure measurements in the fluid whose flow is being measured. The transducer crystal 30 may be connected through a suitable RF filter to an electrometer or charge amplifier to amplify the piezoelectric voltages generated by the crystal 30 as a result of pressure stresses. Point 31 in FIG. 1 may be connected to the filter, such as an RF choke. Capacitor 32 in FIG. 1 is selected so as to pass the high frequency RF signals, but essentially presents an open circuit at lower frequencies. The RF filter is selected to pass the lower frequencies (such as audio frequencies) but to be of extremely high impedance for radio frequencies. By providing such isolation, the flow measurement and the pressure measurement may be made simultaneously using the same crystal but be essentially independent of each other. In the measurement of blood flow, the measurement of pressure also provides considerable information as to the compliance of the vascular system.

FIG. 3 is an alternative arrangement of a flowmeter circuit constructed in accordance with the teachings of the present invention. This circuit arrangement also is particularly adaptable for both flow and pressure measurement. A transistorized oscillator 110 which provides output signals in the 10 to 15 megacycle range is connected through a double amplifier 115 and a driver amplifier 120 to a crystal transducer 30. The crystal 30 may be mounted in a probe of the nature of that illustrated in FIG. 2.

The crystal 30 is connected through a transistorized signal amplifier 130 to a demodulator or ratio detector 135 having a single ended output. A portion of the drive signal applied to the transducer crystal from the driver amplifier 120 along with Doppler shifted reflected signals received from the transducer crystal are amplified by the signal amplifier 130 and fed to the demodulator 135. Any variation in frequency of the reflected signal relative to that of the drive signal is detected and the resulting output signals, which are typically in the 0 to 60 kilocycle range, are applied to an audio amplifier 140. These signals are amplified by the amplifier 140 and applied through a frequency meter 145, such as the frequency meter 80 in FIG. 1, which provides a D.C. output voltage proportional to the input frequency. This D.C. output voltage thus is proportional to flow velocity and may be metered or recorded.

The crystal transducer 30 also may be connected through inductances 150 and 151 to the input of a charge amplifier 155, such as an operational amplifier having capacitive feedback and a high input impedance (which integrates input current and provides a voltage output), to amplify the piezoelectric voltages generated by the crystal transducer as a result of pressure stresses. The inductances 150 and 151 are selected to pass audio frequencies but to be of extremely high impedance for radio frequencies. Thus flow measurements as well as pressure measurements can be made simultaneously using the same crystal transducer while maintaining these two measurements essentially independent of each other. It will be appreciated to those skilled in the art that components and conductors discussed herein which transfer higher frequency signals may be suitably shielded.

It now should be apparent that the present invention provides a new and improved ultrasonic flowmeter utilizing a single ultrasonic transducer and Doppler shift measurement techniques. Additionally, pressure measurements also may be made. Although exemplary embodiments of the invention have been disclosed and discussed, it will be understood that other applications of the invention are possible and that the embodiments and methods disclosed may be subjected to various changes, modifications and substitutions without necessarily departing from the spirit of the invention.

What is claimed is:
1. An ultrasonic flowmeter for use with a single piezoelectric transducer for measuring fluid flow comprising:
   a generator of a carrier signal;
   first means coupling said generator to said transducer for driving said transducer at an ultrasonic frequency to cause it to emit ultrasonic waves at said carrier signal frequency into said fluid, said transducer simultaneously receiving Doppler shift frequency waves reflected by constituents in said fluid to provide a modulated carrier signal;
   a demodulator for providing an output signal proportional to the distance between said carrier signal frequency and said Doppler shift frequency;
   second means coupling said transducer to said demodulator for exciting said demodulator with said modulated carrier signal;
   an amplifier;
   means coupling said transducer to said amplifier to amplify the piezoelectric voltages generated therein, said coupling means including means for suppressing said modulated carrier signal whereby fluid pressure measurements are made simultaneously with fluid flow measurements.

2. An ultrasonic flowmeter as defined in claim 1 wherein said demodulator is a synchronous demodulator coupled to said generator to receive said carrier signal at said ultrasonic frequency in synchronism with said modulated carrier signal.

3. An ultrasonic flowmeter as defined in claim 1 wherein said transducer is mounted in a vascular catheter.

4. An ultrasonic flowmeter as defined in claim 1 wherein said demodulator is a ratio detector coupled only to said transducer to receive said modulated carrier signal, whereby any variation in frequency of the Doppler shifted frequency waves relative to the carrier signal frequency is detected.

5. An ultrasonic flowmeter as defined in claim 4 wherein said transducer is mounted in a vascular catheter.

6. An ultrasonic flowmeter as defined in claim 1, the combination further comprising third means coupled to said demodulator for providing a visual output indicative of the velocity of fluid flow.

7. An ultrasonic flowmeter as defined in claim 6 wherein said demodulator is a synchronous demodulator coupled to said generator to receive said carrier signal at said ultrasonic frequency in synchronism with said modulated carrier signal.

8. An ultrasonic flowmeter as defined in claim 7 wherein said transducer is mounted in a vascular catheter.

9. An ultrasonic flowmeter as defined in claim 8 wherein said first and second means each comprises a buffer amplifier.

10. An ultrasonic flowmeter as defined in claim 9 wherein said synchronous demodulator is coupled to said generator by a buffer amplifier.

References Cited

UNITED STATES PATENTS

| 1,864,638 | 6/1932 | Chilowsky. |
| 2,770,795 | 11/1956 | Peterson. |
| 2,841,775 | 7/1958 | Saunders. |
| 3,097,526 | 7/1963 | Fischbacher. |

FOREIGN PATENTS

| 1,232,113 | 4/1960 | France. |

OTHER REFERENCES

A text by B. Carlin entitled "Ultrasonics," 2nd ed., McGraw-Hill Book Company, Inc., New York, 1960, p. 1.

An article from "Ultrasonics," April–June 1964 by S. Kimoto et al., entitled "Ultrasonic Tomography of the Liver and Detection of Heart Atrial Septal Defect With the Aid of Ultrasonic Intravenous Probes," pp. 82–86, p. 82.

A text, "Fundamentals of Radio" by E. C. Jordan et al., published by Prentice-Hall, Inc., New York, 1955, p. 285.

JAMES J. GILL, *Primary Examiner.*

U.S. Cl. X.R.

73—398